March 22, 1966     H. DEANS     3,242,029
ULTRASONIC SEALER FOR SEALING PLASTICS
Filed May 13, 1963     2 Sheets-Sheet 1
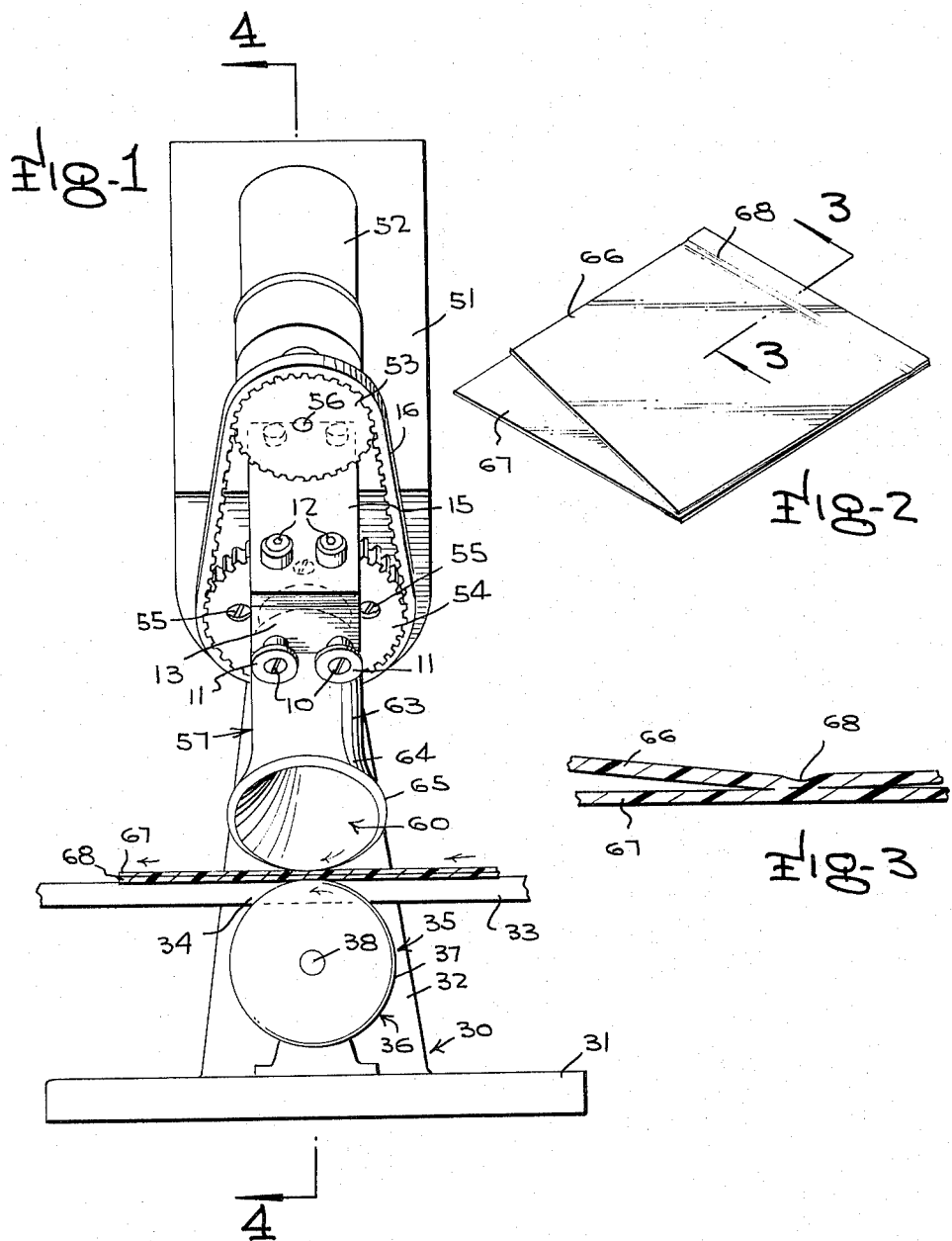
INVENTOR.
HOWARD DEANS
BY
Sherman Levy   ATTORNEY

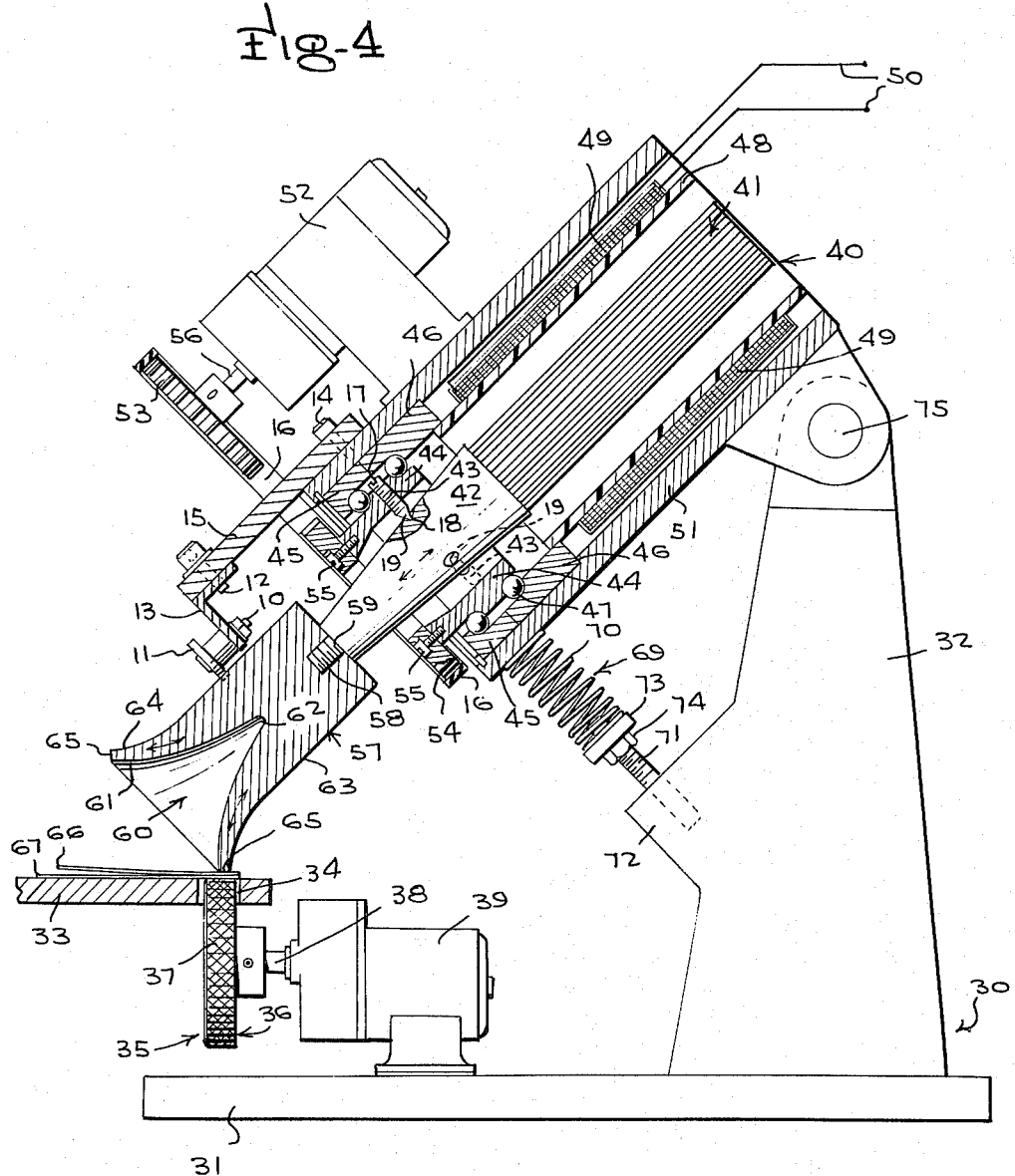

United States Patent Office 3,242,029
Patented Mar. 22, 1966

3,242,029
ULTRASONIC SEALER FOR SEALING PLASTICS
Howard Deans, Secane, Pa., assignor, by mesne assignments, to Kleer-Vu Industries, Inc., New York, N.Y.
Filed May 13, 1963, Ser. No. 280,015
4 Claims. (Cl. 156—380)

The present invention relates to ultrasonic sealing or bonding of articles or materials such as thermoplastics.

An object of the present invention is to provide an ultrasonic sealing means which includes a transducer element that has a rotating tool operatively connected thereto, and wherein the rotating tool is adapted to cooperate with an anvil, and wherein the anvil may be stationary or the anvil may rotate in synchronism with the rotating tool.

Another object of the present invention is to provide a sealing device for continuous bonding operations, wherein there is little or no frictional contact with the plastic being sealed, and wherein the present invention is especially suitable for use on films of plastic and wherein the tool is adapted to be rotated as a wheel on the plastic to be bonded and with the present invention a highly efficient tool of a unique construction is combined with the transducer to accomplish the desired results.

A further object is to provide an ultrasonic plastic sealing device wherein the necessary compressional forces are provided to bring about the sealing of the plastics, and wherein the compressional force perpendicular to the film is obtained or provided by means of a rotating tool which has a bell shaped end that acts as a wave guide and this serves to change the direction of the compressional wave from along the axis of the transducer and tool to the proper angle or direction so that the desired plastic welding can be readily and efficiently accomplished.

Another object is to provide an apparatus of the character described that may be utilized speedily and with precision by even inexperienced operators, and wherein the present invention is economical to manufacture, efficient in operation and rugged in structure and relatively simple to use.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIG. 1 is an elevational view of the ultrasonic plastic sealing device of the present invention.

FIG. 2 is a perspective view showing the work pieces or plastic members sealed or bonded by means of the present invention.

FIG. 3 is a sectional view taken on the line 3—3 of FIG. 2.

FIG. 4 is a sectional view taken on the line 4—4 of FIG. 1.

Referring in detail to the drawings, the numeral 30 indicates a suitable support or member which may include a horizontally disposed base or portion 31 as well as an upstanding post or portion 32, and the numeral 33 indicates a horizontally disposed platform which may have a slot 34 therein. As shown in FIG. 4, the numeral 35 indicates an anvil which may include a rotating wheel 36 that has its outer periphery roughened or knurled as at 37, and the wheel 36 may be driven or rotated by means of a shaft 38 which is operated from a motor 39.

The numeral 40 indicates the transducer element which embodies a metal magnetostrictive core or stack 41, and as shown in the drawings a body member 42 is fixedly secured to the stack 41. The numeral 43 indicates nodal screw supports that have inner pointed ends 19 which are adapted to engage recesses 18 in the body member 42, and slots or kerfs 17 are arranged in the outer ends of the nodal screw supports 43. A retainer 44 has the nodal screw support 43 mounted therein. The numerals 45 and 46 indicate support pieces which are arranged as shown in the drawings, and bearings 47 are interposed between the support pieces 45 and 46 and the retainer 44 for a purpose to be later described.

There is further provided a tubular form 48 that is stationary, and the form 48 may be suitably affixed to support piece 46. The numeral 49 indicates a coil winding which is wound on the tubular form 48, and the coil winding 49 is adapted to be connected to a suitable source of electrical energy as at 50. A housing 51 surrounds the coil winding 49 and a drive motor 52 may be suitably supported contiguous to the outer surface of the housing 51. The numeral 56 indicates a drive shaft driven by the motor 52, and the shaft 56 serves to rotate a sprocket or pulley 53 which has an endless belt 16 arranged in engagement therewith, and the belt 16 is also arranged in engagement with a sprocket or pulley member 54, and the member 54 is suitably connected to the retainer 44 as, for example, by means of securing elements 55. It is to be understood that other types of drive mechanisms can be used in place of or instead of the herein illustrated belt drive arrangement, as for example intermeshing gears or the like can be used, as desired or required.

As shown in FIGS. 1 and 4 for example, there is provided a rotating tool which is indicated generally by the numeral 57, and the tool 57 is suitably connected to the body member 42 as, for example, by means of a threaded recess 58 in an end of the tool 57 which threadedly receives a reduced diameter threaded shank or stud 59 on the end of the body member 42. The tool 57 is shown provided with an inner recess that is indicated by the numeral 60 and the recess 60 includes an outer portion 61 of enlarged formation and a smaller portion 62 of reduced size. The tool 57 is adapted to have a generally cylindrical main portion 63 which merges or terminates in an outwardly flaring or bell shaped end portion 64, and the bell shaped end portion 64 has a generally flat continuous surface 65 that defines or provides an annular shoulder, and this shoulder 65 is adapted to cooperate or coact with the anvil 35 as, for example, when plastic members or articles such as the articles 66 and 67 are being bonded or welded to form the seal such as the seal 68.

There is further provided a spring mounting which is indicated generally by the numeral 69, and the spring mounting 69 includes a spring member 70 which engages a portion of the housing 51, and the spring member 70 is operatively connected to a threaded bolt or stud 71 which may be arranged in threaded engagement with a member such as a projection 72 of the post 32. A stop piece 73 is shown arranged continguous to an adjustable nut 74 and this arrangement provides one means for varying or adjusting the tension or pressure exerted by the spring 70. The numeral 75 indicates a pivotal connection or hinge connection between the housing 51 and the upright or post 32.

From the foregoing, it will be seen that there has been provided a method of and means for sealing plastics and the like by ultrasonics, and in use with the parts arranged as shown in the drawings, the transducer 40 is adapted to be connected to the usual source of electrical energy as, for example, by means of the conductors 50 and with the plastic members such as the members 66 and 67 arranged on a suitable support such as the support 33 above the anvil such as the anvil 35, the parts can be sealed as at 68. The tubular form 48 is stationary, and the stack or core 41 vibrates due to the provision of the coil winding 49 on the form 48. As the stack 41 vibrates within the stationary form 48, the body member 42 will likewise vibrate ultrasonically because the member 42 is rigidly affixed to the stack 41. Since the tool 57 is connected to the member 42 as at 59, it will be seen that the tool 57 will likewise vibrate within the ultrasonic range along with the member 42 and the stack 41.

In addition, the tool 57 will rotate along the material or plastic work pieces 66 and 67 being worked on and this rotation is brought about by means of drive mechanism such as that shown in the drawings. Thus, the motor 52 is adapted to be connected to a suitable source of electrical energy and this motor 52 rotates the shaft 56 which in turn rotates the sprocket 53 and this sprocket 53 has the belt 16 arranged in engagement therewith, and the belt 16 also engages a sprocket 54, and since the sprocket 54 is connected as at 55 to the retainer 44, this will result in rotation of the body member 42 due to the provision of the nodal support 43. As the member 42 rotates it will cause corresponding rotation of the tool 57 so that the desired sealing or bonding of the plastic can be readily effected.

The housing 51 is adapted to be pivotally connected to the post 32 as at 75, and the spring mounting 69 is of the adjustable type so that for example by rotating the nut 74 the pressure exerted by the spring 70 can be regulated or varied as desired.

The anvil 35 may consist of the rotating wheel 36 which has its outer surface roughened or knurled as at 37 to provide a better gripping action on the under surface of the plastic, and the wheel 36 is adapted to be driven by means of the shaft 38 which is driven from the motor 39. The slot 34 may provide sufficient clearance for the wheel 36 to rotate in engagement with the lower surface of the plastic.

The parts can be made of any suitable material and in different shapes or sizes.

The present invention is therefore a rotating tool ultrasonic plastic sealing device and the present invention is particularly useful in the field of ultrasonic plastic welding since it provides a sealing tool for continuous bonding operations and has little or no frictional contact with the plastic being sealed. Heretofore there has been used a tapered tool cone having a rounded tip of one form or another which was impressed upon the overlapped plastic films to be bonded. The intense pressure of 1,000 to 3,000 pounds per square inch beneath the concentrated sealing tip produced various problems particularly in connection with heavy films since it prevented easy passage of the plastic beneath the tip due to the friction encountered. Thin films do not present as much of a problem because the tool vibrating one- or two-thousandths of an inch perpendicular to the plastic, lifts itself away from the surface for a fraction of each cycle of vibration and frees the film for an instant each cycle and this permits it to be transported readily. However, heavier films do not exhibit this freedom and efforts to make continuous seals on such materials heretobefore have not been successful and have been therefore somewhat limited.

Also, attempts were made to attach roller wheels of various types to the end of the tool cones, and any element of mass attached to the tool tip is moved through a few thousandths of an inch, 20,000 times per second or more depending upon the frequency employed. Because of this, any such attachment is subjected to forces of several thousand G's and will not withstand the very high stresses involved. In addition the ultrasonic compressional wave transmission will not transfer itself through any interference in the homogeneous mass of the tool, and this therefore defeats the use of any clearance regardless of how slight that is necessary for a rotating attachment.

The present invention overcomes these problems since the entire tool rotates as a wheel on the plastic to be bonded and to accomplish this, a unique tool and transducer combination is used.

It will be seen that in the rotating ultrasonic tool of the present invention, the transducer element 40 consists of the metal magnetostrictive core or stack 41 which is affixed as by brazing to the connecting body member 42. This is mounted at its nodal point on a pair of ball or roller bearings 47. It will be seen that the coil winding 49 surrounding the core 41 is not attached to the core but is wound on the separate tubular form 48 which remains stationary at all times. The tool 57 is attached to the transducer stack connecting body member 42 by means of the threaded screw connection 59, 58, and the tool 57 has a unique configuration or construction. It will be seen that the convergence necessary to gain amplitude amplification is obtained by using an internal taper or recess 60 within the tool 57. A compressional force perpendicular to the film 66, 67 is obtained through the bell shaped end 64 on the tool which acts as a wave guide. This changes the direction of the compressional wave from along the axis of the transducer and tool to a direction which is radial around the periphery of the bell approximately 45 degrees from the axis. It has been found that angles of less than that present some problems in tracking the rolling action of the tool. Also greater angles increase the shear components of force on the plastic film. However, the present invention is not restricted to any particular angle and it is to be understood that a range of angles are within the scope of the present invention as, for example, any angle up to 90 degrees will provide some degree of sealing.

The transducer and tool combination are rotated by the motor driven shaft 56 through pulleys 53 and 54, but it is to be understood that other suitable driving means can be used instead of the pulleys 53 and 54. Also, the anvil may consist of a flat block, but preferably it is a rotating wheel 36, and the face of the wheel 36 is roughened or knurled and acts as an anvil and the wheel 36 serves to transport or move the material or plastic beneath the rotating tool 57. That is, when using the rotating wheel 36, the roughened or knurled surface 37 will engage the plastic or film to move it or carry it into position below the rotating tool 57, so that continuous bonding of the plastic can be readily accomplished. The bell shaped portion 64 has the annular surface 65 which serves to insure that the proper bonding or sealing will take place. In addition the anvil wheel 36 is preferably driven at a speed that is synchronous with that of the rotating tool 57 and this can be accomplished or maintained in any suitable manner as, for example, by means of mechanical linkages, synchronous motor drives for the motors 39 and 52 or any other suitable means. The entire assembly is fastened to the support 32 by means of the bearing pivot 75 so that the weight of the unit will rest on the film 66, 67 or the like. The pressure of the tool on the plastic can then be controlled by the spring 70 which either counterbalances this weight or adds to it as required or desired.

It is recognized that rotating tools have been used in other applications such as in metal bonding for example, as shown in prior Patent 2,946,120. However in metal bonding, ultrasonic shear forces must be provided on the surface of the metal, and not compressional as in plastic sealing. These shear forces are readily provided in the rotating disc used in metal bonding, but no compressional wave deflection is performed or utilized as in the present invention.

The present invention can be used for sealing various types of plastics together such as films, and in addition the present invention can be used for bonding or sealing plastics to cardboard, paper or the like, and also synthetic fabrics can be sealed or bonded. With the present invention, the combination transducer and tool not only oscillate but also rotate as previously stated. The present invention can be used for sealing or bonding a wide variety of useful products, in a highly efficient manner. The device is versatile, and permits fast efficient firm sealing or bonding of various types of plastics.

The present invention can be used for successfully sealing plastic materials whose surfaces are contaminated with various substances. Thus, bonds can be made through liquids, greases, clinging powders and the like and thus the present invention readily lends itself to many interesting applications in packaging where seals are made through the product itself.

In some instances an anvil may not be necessary since certain plastics of the proper shape and volume will act as their own anvils in bonding other parts to them.

It is to be understood that various types of accessory equipment can be used with the present invention as desired or required. The present invention may be incorporated in an ultrasonic sealing machine containing components such as an electrical high frequency generator for converting the low frequency electrical input into an alternating current electrical output with a frequency that is in the ultrasonic range, a transducer, tool, and a hard surface or anvil against which the tool acts on the film. The magnetostrictive transducer utilizes the ability of certain metals to undergo minute expansions and contractions when subjected to an oscillating magnetic field.

For welding plastics, the amplitude of the ultrasonic vibration produced by the transducer must be focused on the work and further amplified to a usable value. The surface 65 of the tool 57 can be dressed for further service, as for example when the surface 65 becomes worn from continued usage. When using the present invention, to execute a weld, the tool must be applied to the plastic film so that it exerts pressure upon the material. There are various ways of imparting ultrasonic energy to different materials to promote fusion and welding action. In rigid materials of a relatively non-compressible nature such as thin metal sheets or foils, the materials can be welded or bonded by utilizing a "shear wave" mode of operation and here vibrations of the welding tip are parallel to the surface of the material and at the same time the welding tool acts to keep the material under compression. However in the bonding of plastic materials, it has been found much more efficient to utilize the "compression wave" mode to create a weld and this involves vibration of the tool perpendicular to the two films being joined. Compressing and decompressing the resilient plastic at such a high speed generates heat internally in the material and fusion results in the desired manner.

In addition to the present invention being used for welding conventional plastic films, it can also be used for bonding synthetic fabrics such as nylon, or those sold under the trademarks "Dacron" (a polyethylene glycolterephthalate), and "Orlon" (polyacrylate).

Also the present invention can be used for fusing plastic coated papers and foils. Generally ultrasonic welding must be effected between two like materials but under certain conditions bonds can be made between unlike materials as, for example, plastic can be joined to paper or cloth. Also the present invention can be used for bonding plastic films that are coated with contaminants.

The present invention will greatly simplify bonding operations and will permit continuous sealing or bonding to be effected so that such work can be accomplished with greater speed and with less effort and at less cost than has heretofore been possible.

In the drawings, the numeral 15 indicates a frame support piece which may be secured to the housing 51 in any suitable manner as, for example, by means of securing elements 14, and an L-shaped bracket 13 is adapted to be secured to the frame support piece 15 as at 12. A pair of rollers 11 are journalled to the bracket 13 by means of pins or axles 10.

With the present invention the rigidity of the end of the tool is more than adequate to produce the accurate rolling action needed for this device. The transducer element core or stack 41, body member 42 and tool 57, being vibrating members, each has a nodal point somewhere midway between its extremities. Because the transducer is enclosed within the coil form 48 and is practically inaccessible, this cannot be used as a support point, and as a result the tool is used for such a support.

Because all of the forces are upward on the tool when it is in use, rollers 11 have been arranged or placed at the nodal point of the tool which act as restraining members to prevent upward deflection. Since the tool is round, these function quite well. The rollers 11 may be nylon faced in order to absorb any vibratory energy which might exist at this point.

Although this construction ordinarily works quite satisfactorily, under very heavy pressure loads on the tool, these rollers act as a fulcrum point and some slight deflection still occurs if a flexible support is used at the nodal point of the body 42. In order to insure that the parts will be properly stabilized, three nodal screw supports 43 are provided at the nodal point of the connecting body member 42 and this type of support gives rigidity and at the same time produces the minimum amount of energy transfer through the three nodal screws 43. Other methods of support can be used as desired or required.

The nodal screw supports 43 are adapted to be arranged in threaded engagement with the retainer or ring support 44, and the inner ends of the nodal screws 43 are pointed as at 19 for engaging recesses or indentations 18 in the body member 42.

As shown in the drawings, the rollers 11 are arranged so that they contact the outer periphery of the tool, and these two rollers are mounted on a rigid support consisting of parts such as the parts 13 and 15, and these rollers are arranged at the nodal point of the tool to prohibit any flexure of the assembly upward as the pressure is applied to the plastic.

Minor changes in shape, size and rearrangement of details coming within the field of invention claimed may be resorted to in actual practice, if desired.

What is claimed is:

1. An ultrasonic sealing device for continuous bonding and sealing of plastics comprising a support member, an anvil comprising a rotating wheel having its outer periphery roughened, a motor for driving said wheel, a transducer comprising a metal magnetostrictive stack, a body member fixedly secured to said stack, a retainer surrounding said body member, nodal screw supports mounted in said retainer and engaging said body member, support pieces contiguous to the outer periphery of said retainer, a stationary tubular form affixed to said support pieces, a coil winding wound on said tubular form, a housing surrounding said coil winding and support pieces, drive means operatively connected to said retainer, a tool connected to said body member, a frame support piece connected to said housing, a bracket affixed to said frame support piece, rollers journalled to said bracket for engaging said tool at the nodal point of the tool and said rollers prohibiting flexure as pressure is applied to the plastic, and said tool having a generally cylindrical main portion which merges into an outwardly flaring bell shaped end portion, the interior of said tool being provided with a recess, said tool having an annular shoulder on the outer portion thereof contiguous to said bell shaped end portion, and a spring mechanism having an adjustable securing element contiguous thereto.

2. In an ultrasonic sealer for bonding and sealing plastics, a transducer and tool combination consisting of a transducer element that embodies a stack, a body member affixed to said stack, a tool connected to said body member, said tool having a bell shaped end portion and an internally tapered recess, and means for oscillating and rotating said transducer and tool combination.

3. In a continuous bonding ultrasonic sealing device for sealing and bonding plastics, a combination transducer and tool, means for oscillating the transducer and tool within an ultrasonic range, means for rotating the transducer and tool, and rollers engaging the tool at the nodal point thereof for prohibiting flexure as pressure is applied to the plastic.

4. An ultrasonic sealer for sealing plastics, comprising a transducer element consisting of a stack, a body member affixed to said stack, a tool connected to said body member, means for oscillating said transducer element, stack, body member and tool, means for simultaneously rotating said stack, body member and tool, rollers engaging said tool at the nodal point thereof for prohibiting flexure as pressure is applied to the plastic, and support means engaging said body member at the nodal point thereof.

References Cited by the Examiner

UNITED STATES PATENTS

| 2,651,148 | 9/1953 | Carwile | 156—73 |
| 2,946,120 | 7/1960 | Jones et al. | 156—73 |

FOREIGN PATENTS

| 1,264,171 | 5/1961 | France. |

EARL M. BERGERT, *Primary Examiner.*

P. DIER, *Assistant Examiner.*